United States Patent [19]

Moore et al.

[11] Patent Number: 5,792,230
[45] Date of Patent: Aug. 11, 1998

[54] AIR REGISTER WITH FILTER ELEMENT

[75] Inventors: Glenn David Moore, New Foundland; Magno Ouano, Jersey City, both of N.J.

[73] Assignee: Melard Manufacturing Corp., Passic, N.J.

[21] Appl. No.: 675,766

[22] Filed: Jul. 3, 1996

[51] Int. Cl.$^6$ .................................................. B01D 39/00
[52] U.S. Cl. ........................ 55/493; 55/385.1; 55/501; 55/504; 55/DIG. 31; 55/DIG. 35; D23/388
[58] Field of Search ........................... 55/493, 501, 511, 55/DIG. 35, 279, 495, 504, 490, DIG. 31, 385.1, 494, 480; 454/284, 289, 292; D23/385–389, 393, 365

[56] References Cited

U.S. PATENT DOCUMENTS

| | | |
|---|---|---|
| 637,519 | 11/1899 | Mertens . |
| 1,385,502 | 7/1921 | Smith et al. .......................... 454/284 |
| 1,429,811 | 9/1922 | Tynan .................................. 55/511 |
| 1,739,372 | 12/1929 | Pirchio . |
| 2,575,499 | 11/1951 | Manow . |
| 2,825,500 | 3/1958 | McLean ................................ 55/511 |
| 3,046,719 | 7/1962 | Tropiano . |
| 3,438,180 | 4/1969 | Klouda ................................. 55/490 |
| 3,724,671 | 4/1973 | Tate ..................................... 55/490 |
| 3,740,934 | 6/1973 | Shuler . |
| 3,902,877 | 9/1975 | Swain .................................. 55/490 |
| 4,252,547 | 2/1981 | Johnson ............................... 55/511 |
| 4,737,174 | 4/1988 | Pontius ................................ 55/493 |
| 4,801,316 | 1/1989 | Schroeder ............................ 55/493 |
| 4,976,753 | 12/1990 | Huang ................................. 55/490 |
| 4,978,375 | 12/1990 | Ilyoo ................................... 55/493 |
| 5,075,000 | 12/1991 | Bernard et al. ..................... 210/168 |
| 5,141,707 | 8/1992 | Brite . |
| 5,176,570 | 1/1993 | Liedl ................................... 454/309 |
| 5,472,380 | 12/1995 | Sarazen, Jr. et al. ............... 55/511 |
| 5,525,145 | 6/1996 | Hodge ................................. 55/495 |

FOREIGN PATENT DOCUMENTS

| | | | |
|---|---|---|---|
| 531313 | 2/1993 | Japan | 55/490 |

*Primary Examiner*—Jay H. Woo
*Assistant Examiner*—Robert Hopkins
*Attorney, Agent, or Firm*—Edgar A. Zarins; Malcolm L. Sutherland

[57] ABSTRACT

An air register with a filter element for filtering particulars from the air flowing from the ductwork into a room. The filter element is replaceable as necessary and is sandwiched within a recess in the register face plate by a pivotable retaining plate. The retaining plate lockingly engages the face plate to retain the filter across the openings of the register. The retaining member facilitates replacement of the filter without having to remove or disassemble the body of the register.

14 Claims, 2 Drawing Sheets

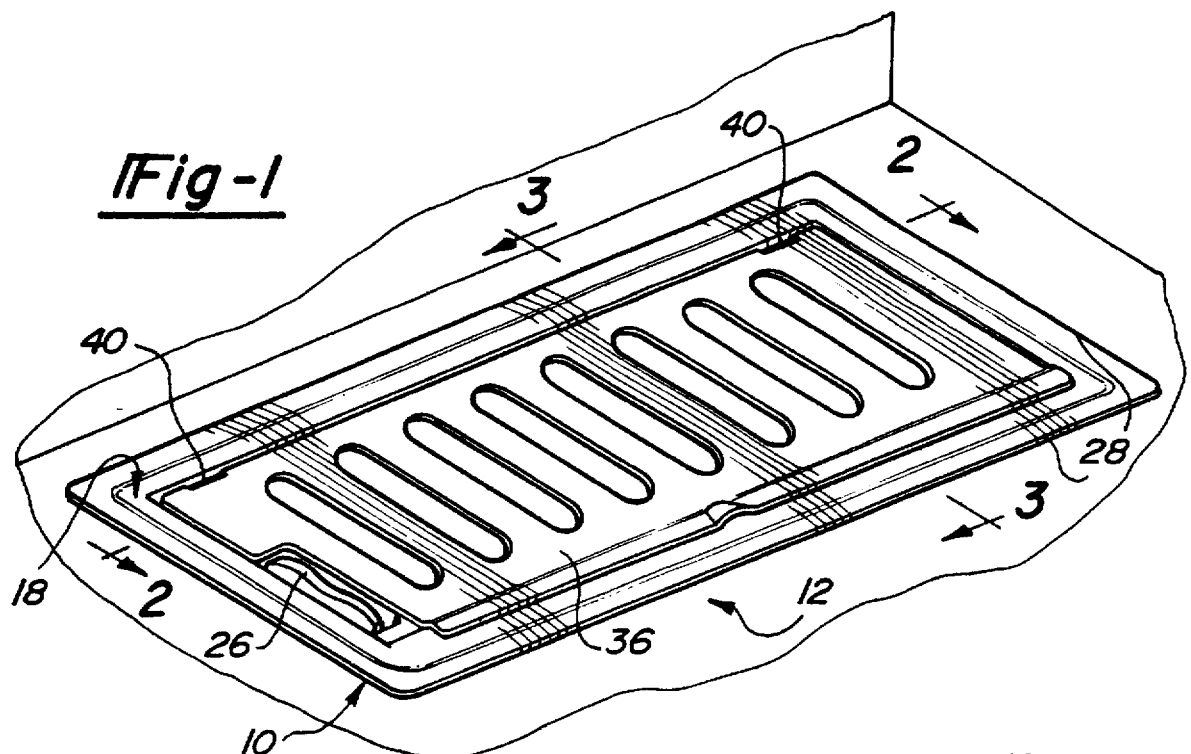
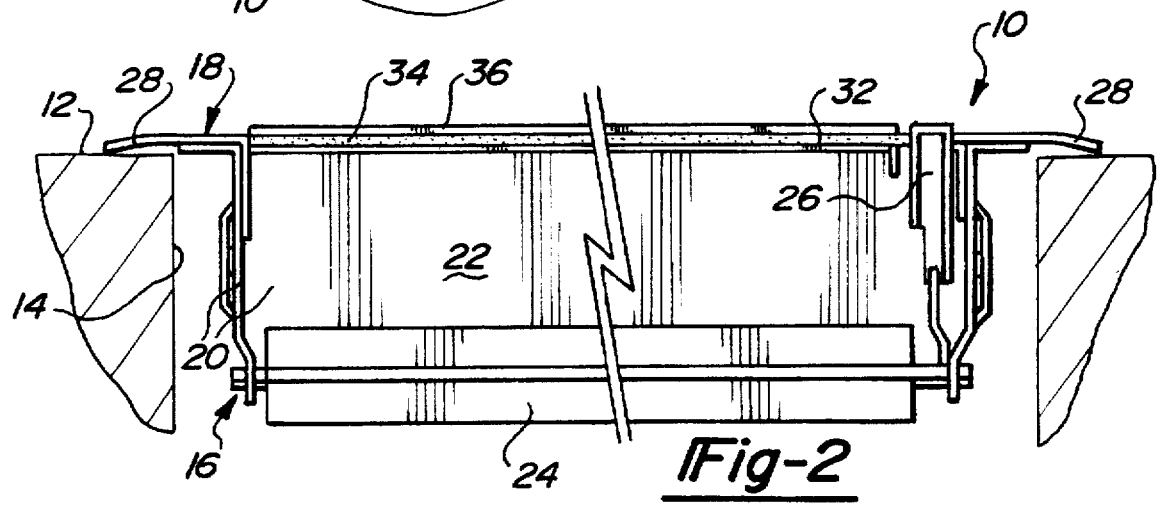
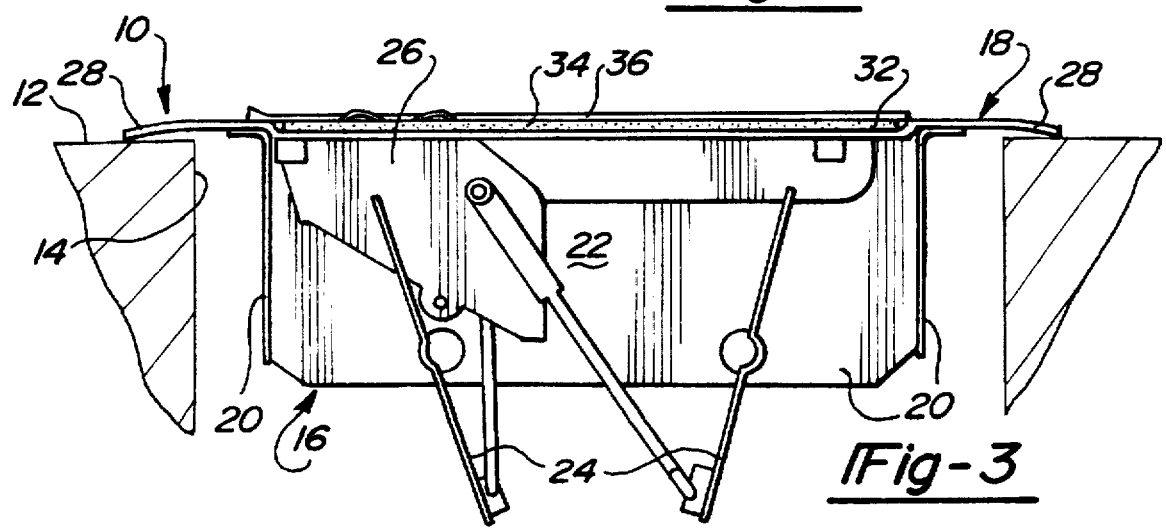

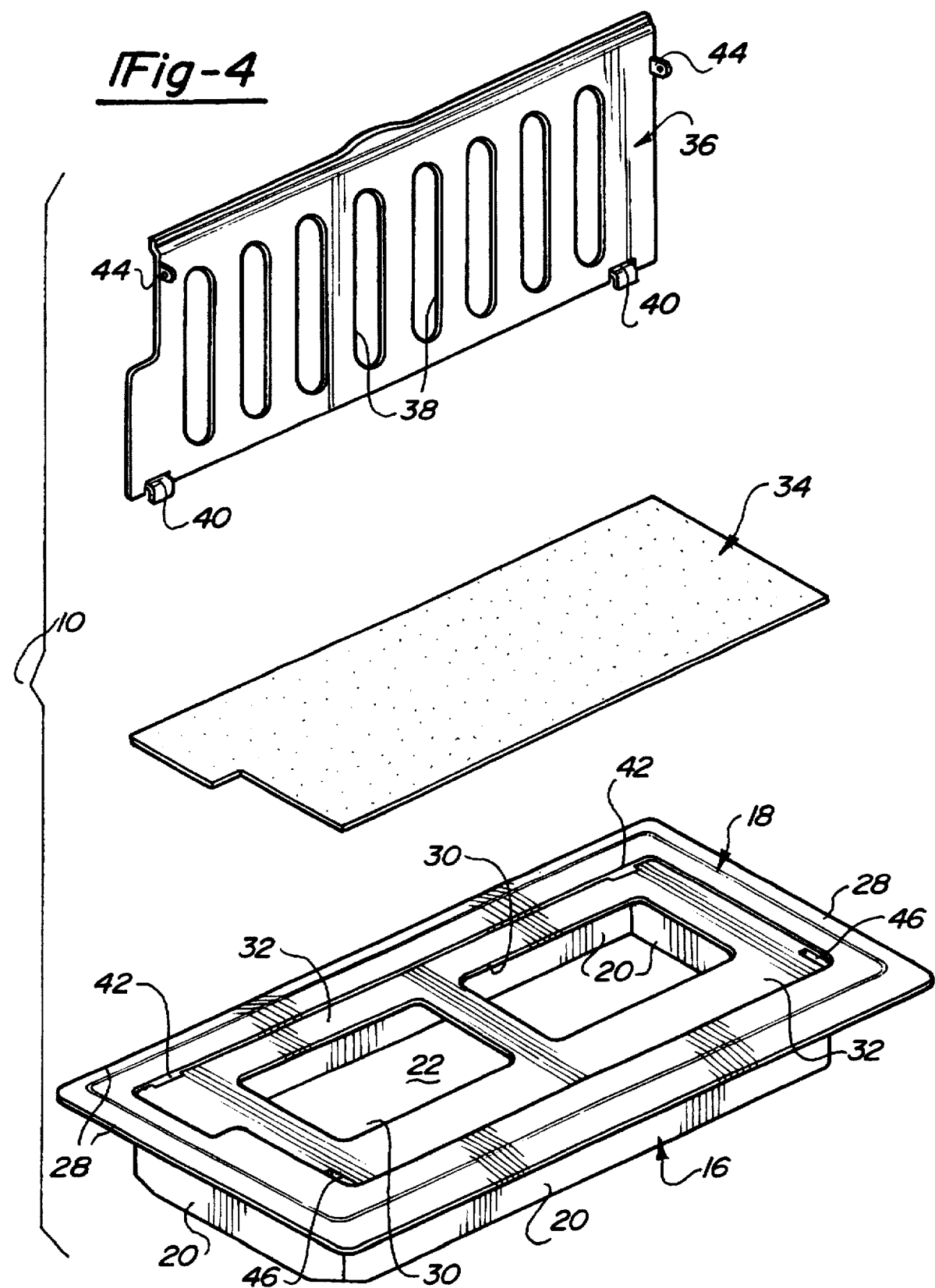

5,792,230

1
AIR REGISTER WITH FILTER ELEMENT

BACKGROUND OF THE INVENTION

I. Field of the Invention

This invention relates to registers for controlling airflow from an air duct into a room and, in particular, to a register with a replaceable filter element positioned across the register opening.

II. Description of the Prior Art

Air registers have become commonplace for controlling the flow of heated or cooled air from a duct system into a room. The register is mounted within the duct opening and typically includes fixed and adjustable louvers for controlling air flow. A face plate incorporates fixed louvers for dispensing air into the room. Mounted to the face plate is a register body which extends into the duct and directs air flow through the face plate. The body includes a plurality of adjustable louvers used to control the direction and volume of air flow. The louvers can typically be closed to block air flow through the register.

Airborne contaminants such as dust and pollen have become of concern to homeowners and the heating and cooling system can circulate such particles throughout the home. Air cleaners and filters have been employed for many years in association with the central system. The air is filtered prior to flowing through the fan housing and into the duct system for delivery to the various areas of the building. However, it has been determined that this central filtering system does not remove all of the contaminants and therefore it is desirable to incorporate secondary filtering prior to introduction of the air into the room by incorporating a filter into the room register.

Prior known registers have been provided with filter elements to filter the air flowing through the register. Since it was believed that few contaminants passed through the central filtering system into the ducts, early registers included filter elements permanently mounted within register body. However, as contaminants clogged the filter air flow becomes restricted requiring replacement of the entire register. Later filtering registers incorporated replaceable filter elements. However, these are imbedded within the body of the register and require removal and disassembly of the register to replace the filter.

SUMMARY OF THE PRESENT INVENTION

The present invention overcomes the disadvantages of the prior known filter registers by providing an easily replaceable filter element accessible through the face of the register.

As with the typical register, the register of the present invention includes a body or box within which adjustable louvers are rotatably mounted to control the volume of air flow through the register. A face plate having at least one opening for air flow is attached to the register body. In a preferred embodiment, the face plate is larger than the duct opening so as to overlap the edges of the opening. The face plate includes a recessed area surrounding the plate opening. A filter element is removably seated within the recess to cover the airflow opening of the face plate. A retaining plate is pivotably mounted to the face plate providing selective access to the filter element. The retaining plate preferably includes a plurality of fixed louvers for dispensing air flow. Pivot fingers formed along one edge of the retaining plate are received within corresponding slots in the face plate. Locking tabs on the retaining plate engage the face plate to close the retaining plate onto the face plate sandwiching the

2 filter member between the retaining plate and face plate. Accordingly, as the filter element needs replacement, the retaining plate can be pivotably opened with respect to the face plate facilitating removal and replacement of the filter element. During use, the filter element is sandwiched between the retaining plate and face plate.

Other objects, features and advantages of the invention will be apparent from the following detailed description taken in connection with the accompanying drawing.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a perspective view of an air register with filter element embodying the present invention positioned within a duct opening;

FIG. 2 is a longitudinal cross-sectional view of the register taken along lines 2—2 of FIG. 1;

FIG. 3 is a lateral cross-sectional view of the register taken along lines 3—3 of FIG. 1; and FIG. 4 is an exploded view of the filter register.

DETAILED DESCRIPTION OF A PREFERRED EMBODIMENT OF THE PRESENT INVENTION

Referring first to FIG. 1, there is shown an air register 10 mounted within a floor 12 of a room. It is to be understood that the register 10 embodying the present invention may be mounted within the floor, wall or ceiling of the room. The register 10 is disposed within an opening 14 in communication with the ductwork of the central heating and cooling system (not shown).

Referring now to FIGS. 1 through 4, the register 10 generally includes a body portion 16 generally in the form of a box disposed within the duct opening 14 and a face plate 18 secured to the body 16. As is well known, the body 16 of the register 10 has side walls 20 forming a passageway 22 directing airflow from the duct 14 through the register 10 as well as adjustable louvers 24 for controlling the airflow therethrough. The louvers 24 are rotatably controlled by an adjustment mechanism 26 protruding through the face plate 18 for adjustment by the user. The louvers 24 are selectively rotatable to control the direction and volume of airflow including blocking the passageway 22.

The face plate 18 is fixedly secured to the body 16 across the passageway 22. The face plate preferably extends beyond the side walls 20 of the body 16 and is larger than the opening 14 to completely cover the opening 14. The edges 28 of the face plate 18 rest on the floor 12 to maintain the register 10 in the duct opening 14. The body portion 16 depends downwardly from the face plate 18 into the duct opening 14.

As best shown in FIG. 4, the face plate 18 includes at least one opening 30 in communication with the passageway 22 of the body to allow airflow through the faceplate 18. The size and shape of the opening 30 are chosen to maximize airflow through the register 10 while maintaining a recessed seat 32 in the face plate 18. The recessed seat 32 formed in the face plate 18 is designed to receive a filter element 34 and retaining plate 36. The filter 34 is configured to cover the openings 30 and preferably extends across substantially the entire recess 32 to ensure filtering of the airflow through the register 10. In order to maintain the filter 34 within the recess yet provide selective access for replacement of the filter 34, a retaining plate 36 is mounted to the face plate 18. Upon assembly, the retaining plate 36 sandwiches the filter element 34 against the recessed seat 32.

The retaining plate 36 includes at least one aperture 38 to allow the flow of air through the register 10. Preferably, the retaining plate 36 includes a plurality of fixed louver openings 38 to dispense the air flow. Formed along one edge of the retaining plate 36 are a pair of pivot fingers 40 which are received in corresponding slots 42 in the face plate 18. In a preferred embodiment, the fingers 40 of the retaining plate 36 are pivotably received within the slots 42 allowing separation of retaining plate 36 from the face plate 18 if desired. Alternative connections between the retaining plate 36 and face plate 18 may include a mechanical hinge or living hinge which would prevent separation of the components. In order to lock the retaining plate 36 on the face plate 18 sandwiching the filter element 34, at least one locking tab 44 is formed on an edge of the retaining plate 36. In a preferred embodiment, the locking tabs 44 engage corresponding slots 46 in the face plate 18. The tabs 44 frictionally engage the side of the slot 46 although any single locking means could be employed to secure the retaining member 36 on the face plate.

The assembly allows the retaining plate 36 to be pivotably opened relative to the face plate 18 for selective access to the filter element 34. The register 10 is assembled by placing the filter 34 in the recessed seat 32 of the face plate 18 then securing the retaining plate 36. The pivot fingers 40 of the retaining plate 36 are inserted into the corresponding slots of the face plate 18. The retaining plate 36 is pivoted closed engaging the locking tabs 44 with the face plate 18. By sandwiching the filter 34 using the retaining plate 36, the assembly forms a low profile substantially similar to conventional registers used in the home. Furthermore, the filter element 34 is essentially unnoticeable since the retaining plate 36 provides the appearance of a conventional register. Nevertheless, the filter element 34 can be quickly and easily replaced by opening the retaining plate 36 and removing the filter 34.

The foregoing detailed description has been given for clearness of understanding only and no unnecessary limitations should be understood therefrom as some modifications will be obvious to those skilled in the art without departing from the scope and spirit of the appended claims.

What is claimed is:

1. An air register for dispensing air into a room, said register comprising:

a body portion having a fluid passageway directing air through said register;

a fixed face plate having at least one opening for the flow of air through said face plate, said face plate fixedly mounted to said body portion such that said body portion depends from an inner surface of said face plate and said face plate forming a support surface, said at least one opening of said face plate directing substantially all air flow from said fluid passageway through said register;

a retaining plate pivotably mounted to an outer surface of said face plate, said retaining plate lockingly engaging said face plate for selective pivotal opening of said retaining plate relative to said fixed face plate; and a filter element positionally captured between said fixed face plate and said pivotable retaining plate to remove airborne particles flowing through said register, said filter element selectively removable from between said face plate and said retaining plate upon pivotably opening said retaining plate relative to said face plate.

2. The register as defined in claim 1 wherein said face plate includes a recessed seat formed on said outer surface for receiving said filter element, said at least one opening for the flow of air disposed in said recessed seat.

3. The register as defined in claim 2 wherein said retaining plate includes a plurality of openings for dispensing air flowing through said register.

4. The register as defined in claim 2 wherein said retaining plate includes at least one pivot finger formed along a first edge of said retaining plate, said at least one pivot finger received in corresponding slots formed in said face plate.

5. The register as defined in claim 4 and further comprising locking means for lockingly engaging said retaining plate to said face plate, said locking means including locking tabs formed on said retaining plate, said locking tabs selectively lockingly engaging said face plate upon closing said retaining plate.

6. The register as defined in claim 1 wherein said body portion includes at least one adjustable louver for controlling airflow through said register.

7. The register as defined in claim 6 wherein said body portion forms a rectangular tube directing airflow through said register, said at least one adjustable louver disposed within said rectangular tube.

8. An air register for dispensing air into a room, said register comprising:

a rectangular body portion having a fluid passageway directing air through said register;

a rectangular face plate having an outer support surface, an inner surface and at least one opening for the flow of air through said face plate, said body portion fixedly mounted to said inner surface with said fluid such that said face plate extends across said fluid passageway with said fluid passageway in direct fluid communication to direct air flow through said at least one opening, said face plate including a recessed seat formed in said outer support surface of said face plate;

a filter element seated within said recess of said face plate across said at least one opening of said face plate; and a retaining plate pivotably attached to said outer surface of said face plate and selectively closable to positionally capture said filter element between said fixed face plate and said pivotable retaining plate within said recessed seat, said retaining plate including a plurality of fixed vanes whereby air flowing through said register is filtered of airborne particles by said filter element and disposed into the room by said fixed vanes of said retaining plate.

9. The register as defined in claim 8 wherein said retaining plate includes means for selectively locking said retaining plate in a closed position substantially parallel to said face plate thereby sandwiching said filter element therebetween.

10. The register as defined in claim 9 wherein said locking means includes at least one locking tab formed on said retaining plate and selectively lockingly engageable with said face plate.

11. The register as defined in claim 9 wherein said retaining plate includes a plurality of pivot fingers formed along a first edge of said retaining plate, said at least one pivot finger received in corresponding slots formed in said face plate.

12. The register as defined in claim 1 wherein said body portion includes at least one adjustable louver for controlling airflow through said register.

13. An air register for dispensing air from an air supplying duct into a room, said register comprising:
- a tubular body portion having a fluid passageway directing air from the duct through said register;
- a face plate fixedly mounted to one end of said tubular body portion across said fluid passageway, said face plate having an outer surface with a recessed seat formed therein and a plurality of openings disposed within said seat, said opening disposed across said fluid passageway for the flow of air through said face plate;
- a filter element seated within said recessed seat of said fixed face plate across said openings of said face plate to filter air flowing therethrough; and
- a retaining plate pivotably attached to said outer surface of said face plate and selectively closable to sandwich said filter element between said fixed face plate and said pivotable retaining plate, said retaining plate including means for locking said retaining plate against said face plate with said filter element therebetween, said retaining plate having a plurality of fixed vanes whereby air flowing through said register is filtered of airborne particles by said filter element and dispensed into the room by said fixed vanes of said retaining plate.

14. The register as defined in claim 13 wherein said retaining plate includes a plurality of pivot fingers formed along a first edge of said retaining plate, said pivot fingers received in corresponding slots formed in said face plate.

* * * * *